(12) United States Patent
Song

(10) Patent No.: US 12,452,940 B2
(45) Date of Patent: Oct. 21, 2025

(54) APPARATUS AND METHOD FOR CONFIGURING DATA COMMUNICATION BETWEEN ROBOT COMPONENTS IN DIFFERENT NETWORKS

(71) Applicant: ELECTRONICS AND TELECOMMUNICATIONS RESEARCH INSTITUTE, Daejeon (KR)

(72) Inventor: Byoung-Youl Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 415 days.

(21) Appl. No.: 17/993,544

(22) Filed: Nov. 23, 2022

(65) Prior Publication Data

US 2023/0171830 A1  Jun. 1, 2023

(30) Foreign Application Priority Data

Nov. 29, 2021 (KR) .......................... 10-2021-0167128

(51) Int. Cl.
*H04W 76/15* (2018.01)
*H04W 76/22* (2018.01)
*H04W 88/16* (2009.01)

(52) U.S. Cl.
CPC ........... *H04W 76/15* (2018.02); *H04W 76/22* (2018.02); *H04W 88/16* (2013.01)

(58) Field of Classification Search
CPC ..... H04W 76/15; H04W 76/22; H04W 88/16; H04W 76/10; H04L 12/46; H04L 61/2503;
(Continued)

(56) References Cited

U.S. PATENT DOCUMENTS

2009/0325610 A1* 12/2009 Liu ...................... H04L 67/1095
455/466
2019/0158314 A1* 5/2019 Choi ....................... H04L 69/26
(Continued)

FOREIGN PATENT DOCUMENTS

JP         2018152778 A    9/2018
KR          101157039 B1   6/2012
(Continued)

*Primary Examiner* — Hashim S Bhatti
*Assistant Examiner* — Noah James Sugden
(74) *Attorney, Agent, or Firm* — Rabin & Berdo, P.C.

(57) ABSTRACT

An apparatus and method for configuring communication between robot components in different networks are provided. The method includes receiving, from at least one first robot component in a subnet, gateway configuration information for requesting a configuration for communication with a second robot component in an additional subnet, performing a gateway-to-gateway connection process by interworking with a target gateway agent corresponding to a target gateway agent address included in the gateway configuration information, and performing at least one of a data forwarding process corresponding to distribution configuration information included in the gateway configuration information, or a data pulling process corresponding to subscription configuration information included in the gateway configuration information, or a combination thereof through a gateway-to-gateway connection channel.

20 Claims, 7 Drawing Sheets

(58) Field of Classification Search
CPC ... H04L 12/66; H04L 41/0803; H04L 67/141; H04L 69/08; H04L 69/26
See application file for complete search history.

(56) References Cited

U.S. PATENT DOCUMENTS

2019/0182356 A1\* 6/2019 Ko .................... H04W 4/20
2022/0092376 A1\* 3/2022 Volkerink ............ H04W 4/029

FOREIGN PATENT DOCUMENTS

| KR | 1020160027789 A | | 3/2016 | | |
| KR | 2017009853 A | \* | 1/2017 | ............. | C30B 15/20 |
| KR | 101711530 B1 | | 3/2017 | | |
| KR | 20170089434 A | \* | 8/2017 | ........... | H04L 41/046 |
| KR | 20170095853 A | \* | 8/2017 | ......... | H04L 12/4633 |
| KR | 20190057984 A | | 5/2019 | | |
| KR | 20190068384 A | | 6/2019 | | |

\* cited by examiner

APPARATUS AND METHOD FOR CONFIGURING DATA COMMUNICATION BETWEEN ROBOT COMPONENTS IN DIFFERENT NETWORKS

CROSS REFERENCE TO RELATED APPLICATION

This application claims the benefit of Korean Patent Application No. 10-2021-0167128, filed Nov. 29, 2021, which is hereby incorporated by reference in its entirety into this application.

BACKGROUND OF THE INVENTION

1. Technical Field

The disclosed embodiment relates to technology for enabling data communication between robot software components that cannot directly communicate with each other using a robot protocol because they are located in different IP address bands or subnets.

2. Description of the Related Art

In an existing robot configuration, the sensor and actuator component of a robot and a system for running a motion planning component, a perception component, and a cognition component are configured in a single subnet, so applications may be executed without a special communication configuration.

However, with the recent development of deep-learning technology, function components to which deep learning is applied are increasingly used in robots, and high computing performance is required therefor. That is, it becomes impossible to provide desired functions using only the computing performance provided by a robot.

In order to solve this problem, a high-performance computing environment is separately configured and is then connected to a robot. Further, with increasing demand for various types of functions and high performance, a cloud-computing environment including multiple high-performance computers is applied. However, in the cloud-computing environment, components are usually provided from networks separate from a subnet to which a robot belongs, so it is impossible to directly apply an existing method for configuring communication between robot components, in which only communication in the same subnet, like an ROS, is assumed.

As a conventional method for solving this problem, there is a method in which a component to be run in a cloud is separately created without using an ROS framework used in robot components and is then connected using an HTTP REST API. However, this method has problems in that already created robot components cannot be reused and in that a robot component has to be developed again so as to enable a corresponding function to be performed in a completely different framework, such as HTTP REST. Also, components in a subnet connected to a cloud are not able to communicate with components in another subnet connected to the cloud.

SUMMARY OF THE INVENTION

An object of the disclosed embodiment is to enable data communication between robot software components that cannot directly communicate with each other using a robot protocol because they are located in different IP address bands or subnets.

A method for configuring communication between robot components in different networks according to an embodiment includes receiving, from at least one first robot component present in a subnet, gateway configuration information for requesting a configuration for communication with a second robot component in another subnet, performing a gateway-to-gateway connection process by interworking with a target gateway agent corresponding to a target gateway agent address included in the gateway configuration information, and performing at least one of a data forwarding process corresponding to distribution configuration information included in the gateway configuration information, or a data pulling process corresponding to subscription configuration information included in the gateway configuration information, or a combination thereof through a gateway-to-gateway connection channel. The distribution configuration information may be information about robot data desired to be provided to robot components in other subnets, and the subscription configuration information may be information about robot data desired to be received from robot components in other subnets.

Here, the gateway configuration information may be delivered from the first robot component through a separate configuration API.

Here, messages may be sent and received according to a gateway agent protocol over the gateway-to-gateway connection channel, and the gateway agent protocol may include a distribution message for requesting a robot data delivery configuration, a distribution cancellation message for requesting cancellation of a robot data delivery configuration, a subscription message for requesting a robot data subscription configuration, a subscription cancellation message for cancelling a request for a robot data subscription configuration, and a data message for transmitting robot data by containing the robot data in a payload.

Here, the gateway-to-gateway connection process may include checking whether a gateway client mapped to the target gateway agent is present in a management list; when a gateway client mapped to the target gateway agent is present in the management list, delivering the gateway configuration information to the gateway client; and when a gateway client mapped to the target gateway agent is not present in the management list, newly generating a gateway client mapped to the target gateway agent, continuously attempting connection to the target gateway agent, and adding the gateway client to the management list when the connection succeeds.

Here, the data forwarding process may include setting a gateway core of the gateway client to receive robot data from the first robot component, sending a distribution message to the target gateway agent, converting robot data of a robot protocol received from the first robot component into a data message, and delivering the data message to the target gateway agent.

Here, the data pulling process may include sending a subscription message to the target gateway agent, preparing for distribution of robot data corresponding to the subscription configuration information, converting a data message received from the target gateway agent into robot data of a robot protocol, and delivering the robot data to the first robot component.

A method for configuring communication between robot components in different networks according to an embodiment may include performing a gateway-to-gateway connection process by interworking with a first additional gateway agent in response to a connection request from the first additional gateway agent and performing at least one of a data forwarding process corresponding to a distribution message delivered from the first additional gateway agent, or a data pulling process corresponding to a subscription message delivered from the first additional gateway agent, or a combination thereof through a gateway-to-gateway connection channel.

Here, messages may be sent and received according to a gateway agent protocol over the gateway-to-gateway connection channel, and the gateway agent protocol may include a distribution message for requesting a robot data delivery configuration, a distribution cancellation message for requesting cancellation of a robot data delivery configuration, a subscription message for requesting a robot data subscription configuration, a subscription cancellation message for cancelling a request for a robot data subscription configuration, and a data message for transmitting robot data by containing the robot data in a payload.

Here, the gateway-to-gateway connection process may comprise allocating a gateway core for sending and receiving the gateway agent protocol to and from the first additional gateway agent.

Here, the data forwarding process may include configuring distribution of robot data corresponding to a topic name and a topic type included in the distribution message, receiving a data message from the first additional gateway agent, converting payload data of the data message into robot data of a robot protocol, and distributing the robot data to a robot component of a subnet that requests subscription to robot data in a corresponding format.

Here, the data forwarding process may further include distributing the data message of the gateway agent protocol to a second additional gateway agent that requests subscription.

Here, the data pulling process may include preparing for reception of robot data corresponding to a topic name and a topic type of the subscription message, converting robot data corresponding to the subscription message, received through a robot protocol, into a data message of the gateway agent protocol, and delivering the data message to the first additional gateway agent.

Here, the method may further include distributing a data message of the gateway agent protocol received from a second additional gateway agent to the first additional gateway agent.

A gateway agent according to an embodiment includes memory in which at least one program is recorded and a processor for executing the program. The program may include at least one gateway client for sending and receiving a gateway agent protocol message over a connection channel with a target gateway agent, which is a connection target, a gateway client manager for newly generating and managing a corresponding gateway client in response to a request to connect to a gateway agent of an additional subnet, a gateway endpoint for sending and receiving a gateway agent protocol message over a connection channel with an additional gateway agent that requests connection, a gateway configuration processor for delivering a communication configuration file to the at least one gateway client and the gateway endpoint, and a robot node manager for linking a robot component included in a subnet to which the gateway agent belongs with the gateway client and the gateway endpoint.

Here, the at least one gateway client may include a persistent connection manager for maintaining a persistent connection with the target gateway agent depending on gateway configuration information delivered from the gateway configuration processor and a first gateway core for performing at least one of a data forwarding process corresponding to distribution configuration information included in the gateway configuration information, or a data pulling process corresponding to subscription configuration information included in the gateway configuration information, or a combination thereof through a gateway-to-gateway connection channel.

Here, the data forwarding process may include setting the first gateway core to receive robot data from a first robot component, sending a distribution message to the target gateway agent, converting robot data of a robot protocol received from the first robot component into a data message, and delivering the data message to the target gateway agent.

Here, the data pulling process may include sending a subscription message to the target gateway agent, preparing for distribution of robot data corresponding to the subscription configuration information, converting a data message received from the target gateway agent into robot data of a robot protocol, and delivering the robot data to a first robot component.

Here, the gateway endpoint may include at least one gateway core for performing at least one of a data forwarding process corresponding to a distribution message received from the additional gateway agent, or a data pulling process corresponding to a subscription message received from the additional gateway agent, or a combination thereof through a gateway-to-gateway connection channel and a multi-client connection manager for generating and managing a gateway core mapped to each of one or more other gateway agents in response to a connection request therefrom.

Here, the data forwarding process may include configuring distribution of robot data corresponding to a topic name and a topic type included in the distribution message, receiving a data message from the additional gateway agent, converting payload data of the data message into robot data of a robot protocol, and distributing the robot data to a robot component in the subnet to which the gateway agent belongs, which requests subscription to robot data in a corresponding format.

Here, the data pulling process may include preparing for reception of robot data corresponding to a topic name and a topic type of the subscription message, converting robot data corresponding to the subscription message, received through a robot protocol, into a data message of a gateway agent protocol, and delivering the data message to the additional gateway agent.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
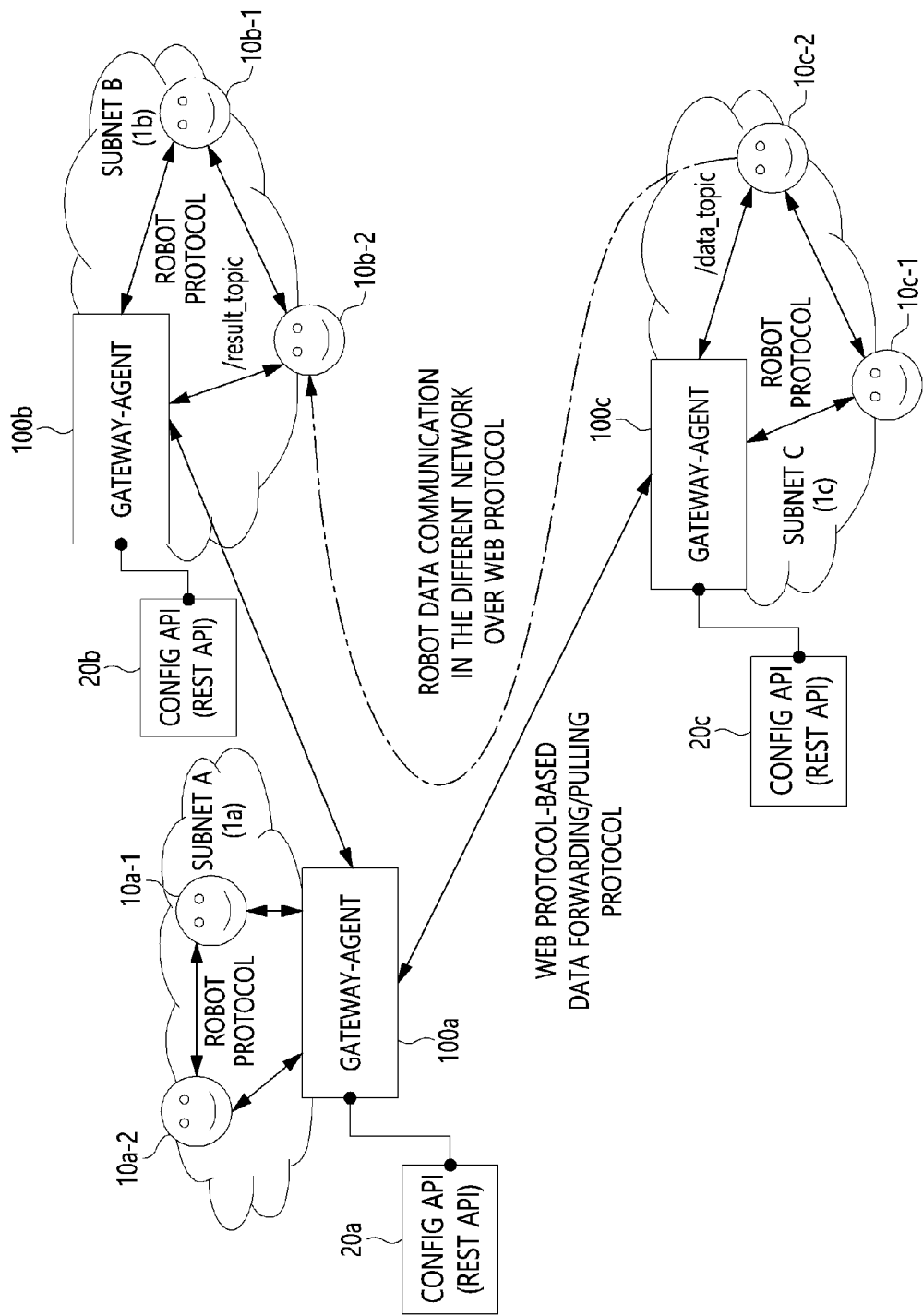
FIG. 1 is a schematic view of a system for configuring communication between robot components in different networks according to an embodiment.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for configuring communication between robot components in different networks according to an embodiment will be described in detail with reference to FIGS. 1 to 8.

Figure 2:
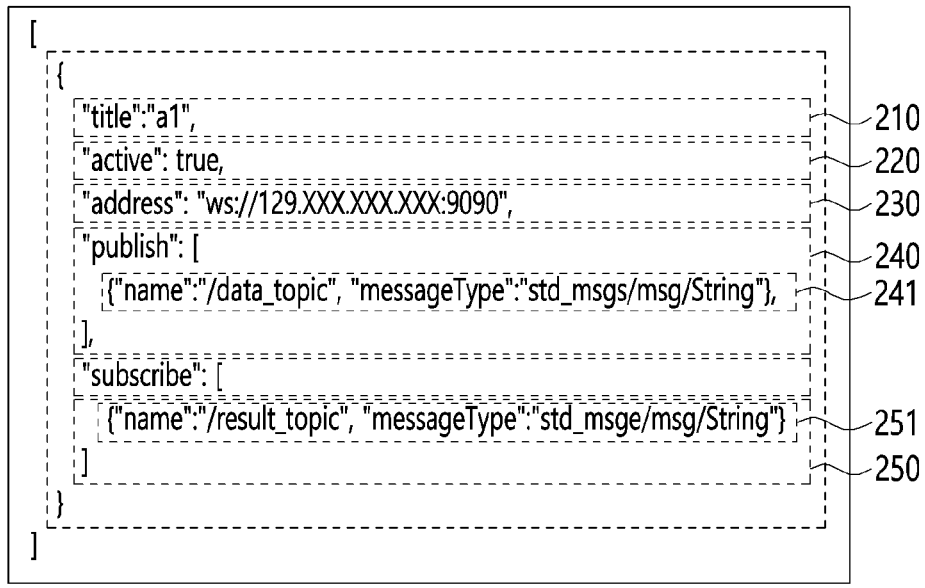
FIGS. 2 and 3 are exemplary views of a configuration file for configuring communication between robot components in different networks according to an embodiment.
Figure 3:
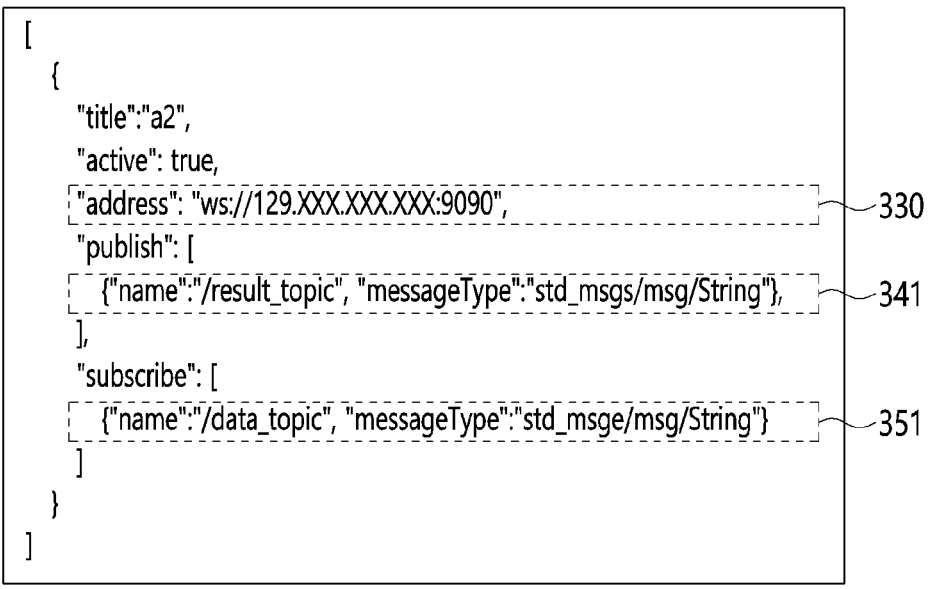
Figure 4:
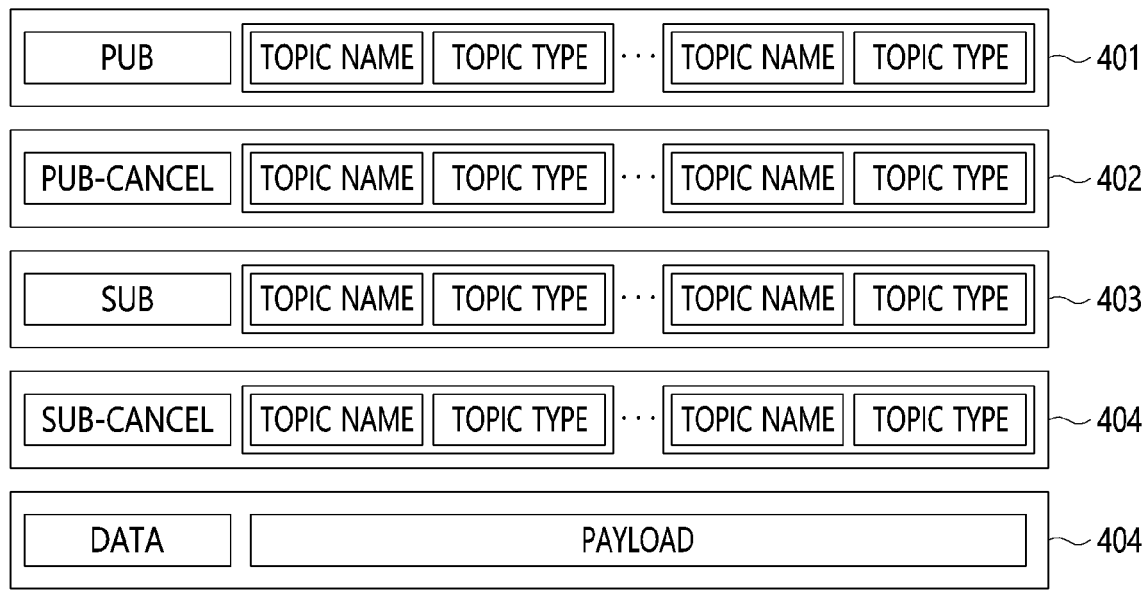
FIG. 4 is a gateway agent protocol for configuring communication between robot components in different networks according to an embodiment.

FIG. 1 is a schematic view of a system for configuring communication between robot components in different networks according to an embodiment, FIGS. 2 and 3 are exemplary views of a configuration file for configuring communication between robot components in different networks according to an embodiment, and FIG. 4 is a gateway agent protocol for configuring communication between robot components in different networks according to an embodiment.

The system for configuring communication between robot components in different networks according to an embodiment may include multiple subnets using different IP address bands. For example, referring to FIG. 1, subnet A 1a, subnet B 1b, and subnet C 1c are network environments that are set as different IP address bands or subnets.

Here, each of the multiple subnets is configured such that at least one robot component using a robot protocol (ROS) that can be used only in the corresponding subnet is run and such that a gateway agent provides service on a unique IP address.

For example, referring to FIG. 1, robot components 10a-1 and 10a-2 using a robot protocol (ROS) are run in subnet A 1a, and a gateway agent 100a therein may provide service on a public IP address (e.g., 129.XXX.XXX.XXX).

Here, the robot protocol (ROS) used in subnet A 1a allows data communication only between the robot components 10a-1 and 10a-2 in the subnet 1a.

In subnet B 1b, robot components 10b-1 and 10b-2 using a robot protocol (ROS) are run, and a gateway agent 100b may provide service on a private IP address (e.g., 192.168.1.20).

Here, the robot protocol (ROS) used in subnet B 1b allows data communication only between the robot components 10b-1 and 10b-2 in the subnet 1b.

In subnet C 1c, robot components 10c-1 and 10c-2 using a robot protocol (ROS) are run, and a gateway agent 100c may provide service on a private IP address (e.g., 172.18.2.20).

Here, the robot protocol (ROS) used in subnet C 1c allows data communication only between the robot components 10c-1 and 10c-2 in the subnet 1c.

According to an embodiment, the gateway agents 100a, 100b, and 100c may respectively provide configuration APIs (config APIs) 20a, 20b, and 20c for transferring configuration information for configuring communication between robot components in different subnets.

Referring to FIGS. 2 and 3, the gateway configuration information between robot components in different networks may include the alias of a communication configuration (title) 210, information about whether the communication configuration is active (active) 220, a target gateway address (address) 230 or 330, distribution configuration information (publish) 240, and subscription configuration information (subscribe) 250.

Here, the distribution configuration information 240 may include pieces of configuration information 241 and 341 about robot data to be distributed. Here, the pieces of configuration information 241 and 341 about the robot data to be distributed may not be written, or multiple pieces of configuration information thereabout may be written.

Also, the subscription configuration information 250 may include pieces of configuration information 251 and 351 about robot data to be subscribed to. Here, the pieces of configuration information 251 and 351 about the robot data to be subscribed to may not be written, or multiple pieces of configuration information thereabout may be written.

Meanwhile, referring again to FIG. 1, gateway agent protocols over a connection channel between the gateway agents 100a, 100b, and 100c are messages sent and received between the gateway agents 100a, 100b, and 100c depending on the gateway configuration information delivered using the configuration APIs 20a, 20b, and 20c.

Referring to FIG. 4, the gateway agent protocol may be configured with a PUB message 401 for requesting multiple data distribution configurations, a PUB-CANCEL message 402 for requesting cancellation of multiple data distribution configurations, a SUB message 403 for requesting multiple data subscriptions, a SUB-CANCEL message 404 for cancelling requests for multiple data subscriptions, and a DATA message 405 for transmitting the robot data to be subscribed to or to be distributed using a payload.

Here, each of the PUB message 401, the PUB-CANCEL message 402, the SUB message 403, and the SUB-CANCEL message 404 may include a topic name and a topic type, which are information about the data to be transmitted from a robot component to other subnets.

Figure 5:
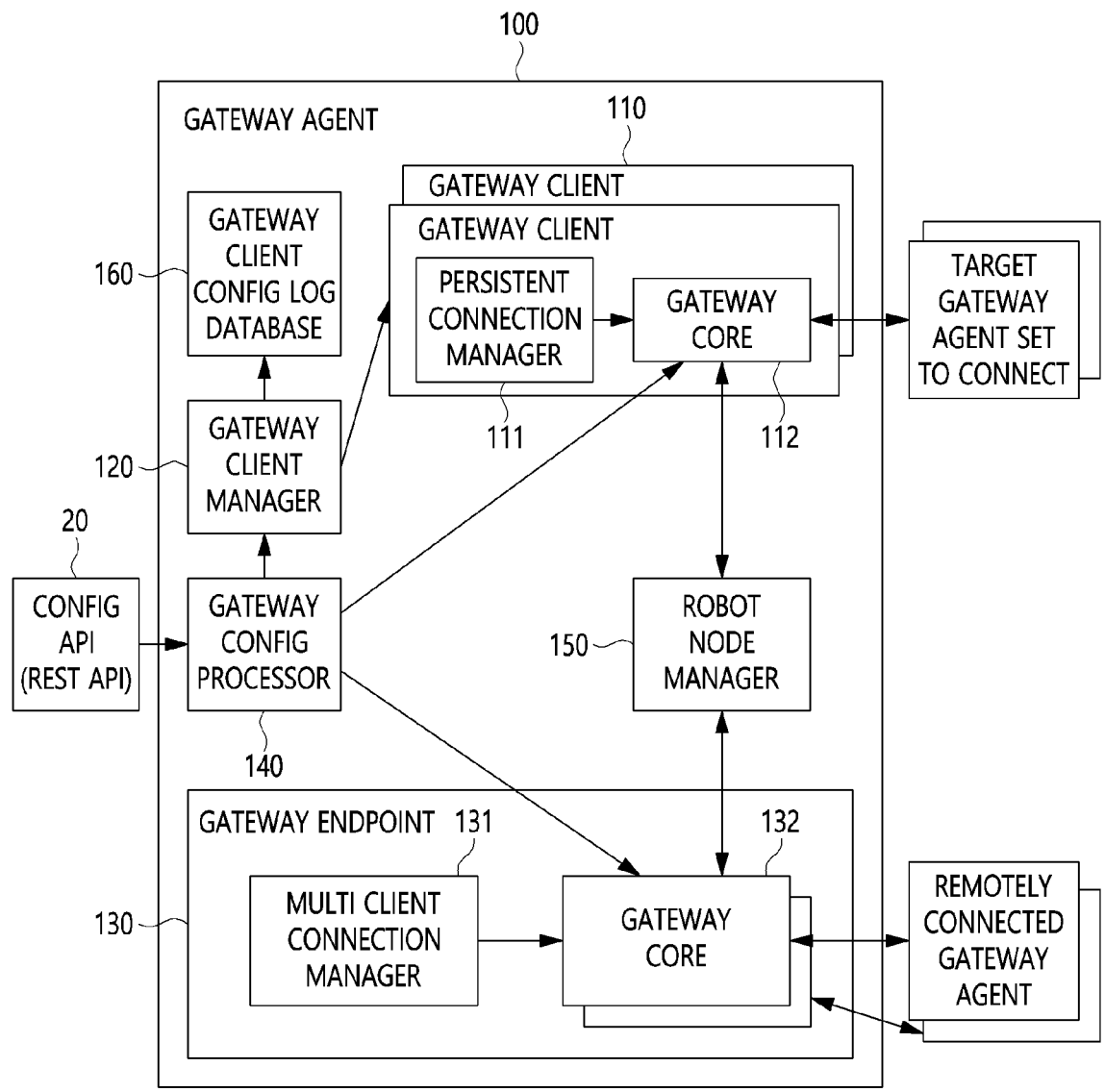
FIG. 5 is a schematic block diagram of the internal configuration of a gateway agent according to an embodiment.
Figure 6:
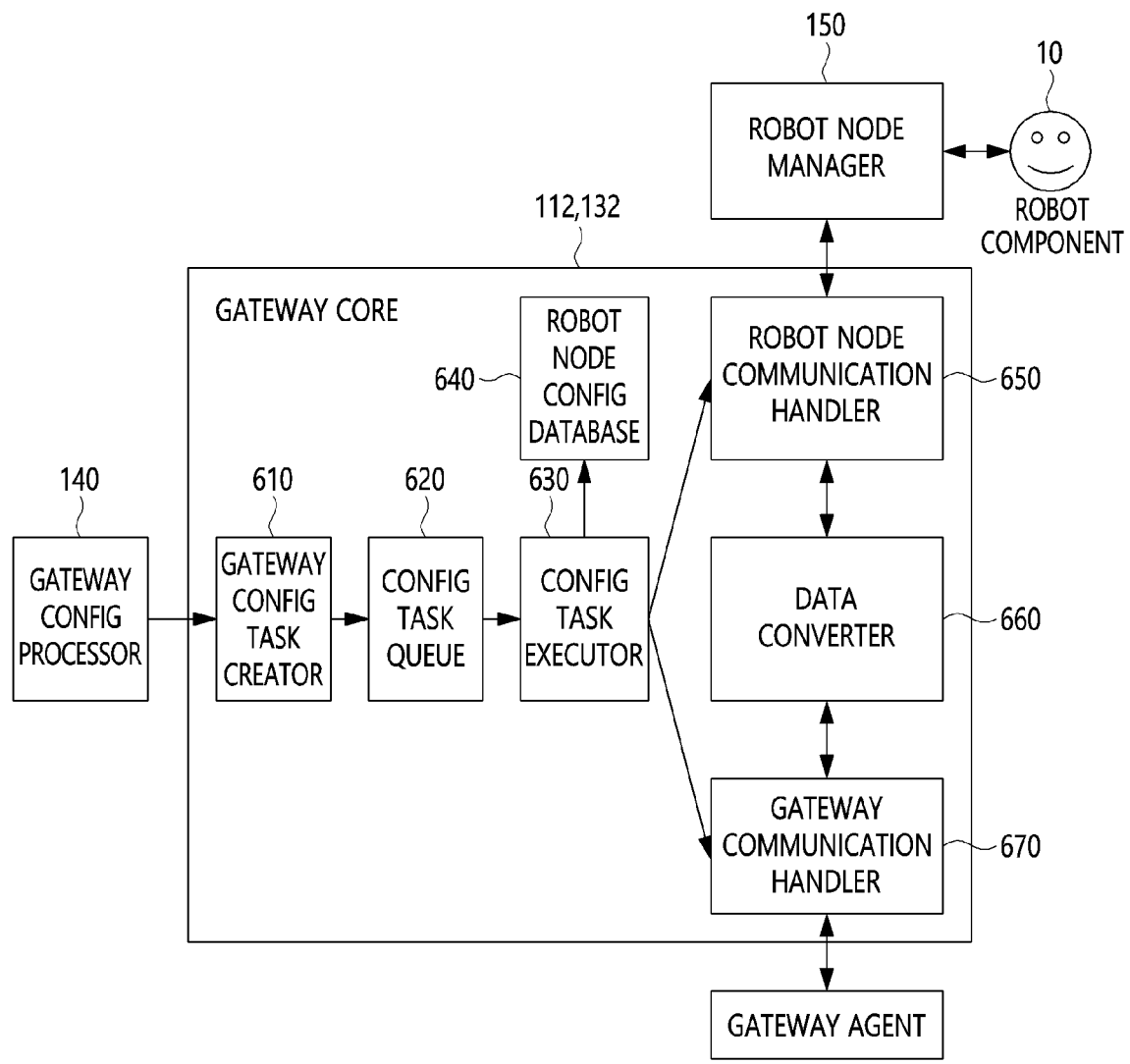
FIG. 6 is a schematic block diagram of the internal configuration of a gateway core according to an embodiment.

FIG. 5 is a schematic block diagram of the internal configuration of a gateway agent according to an embodiment, and FIG. 6 is a schematic block diagram of the internal configuration of a gateway core according to an embodiment.

Referring to FIG. 5, the gateway agent 100 (100a, 100b, or 100c in FIG. 1) may include one or more gateway clients 110, a gateway client manager 120, a gateway endpoint 130, a gateway configuration processor 140, and a robot node manager 150. Also, the gateway agent 100 may further include a gateway client configuration log database 160.

Here, the gateway client 110 connects to a target gateway agent, which is a connection target. The gateway client 110 may include a persistent connection manager 111 and a gateway core 112.

The persistent connection manager 111 maintains a persistent connection to the target gateway agent depending on the gateway configuration information delivered from the gateway configuration processor 140.

The gateway core 112 configures data communication corresponding to distribution configuration information (240 in FIG. 2) or subscription configuration information (250 in FIG. 2) included in the gateway configuration information delivered from the gateway configuration processor 140 or handles a gateway agent protocol (401 to 405 in FIG. 4) delivered from the target gateway agent. The gateway core 112 will be described in detail later with reference to FIG. 6.

Here, the gateway client 110 is created so as to be mapped to each target gateway agent, and may comprise multiple gateway clients.

Accordingly, the gateway client manager 120 performs management operations, such as generation of new gateway clients 110, data update, and the like, in response to a request for connection to a gateway agent in another subnet.

The gateway endpoint 130 handles a connection request from another gateway agent outside. The gateway endpoint 130 may include a multi-client connection manager 131 and one or more gateway cores 132.

The multi-client connection manager 131 performs management in response to connection requests from multiple external gateway agents.

The one or more gateway cores 132 are respectively mapped to one or more connected gateway agents, and handles a corresponding gateway agent protocol (401 to 405 in FIG. 4). The gateway core 132 will be described in detail later with reference to FIG. 6.

The gateway configuration processor 140 delivers a communication configuration file to the one or more gateway clients 110 and the gateway endpoint 130. Here, the communication configuration file may be received through a configuration API 20 (20a, 20b, and 20c in FIG. 1).

The robot node manager 150 links the gateway agent protocol delivered through the gateway cores 112 and 132 to a robot protocol.

The pieces of configuration information of the gateway clients 110, which are changed during the operation of the gateway agent 100, is recorded in the gateway client configuration log database 160.

Referring to FIG. 6, each of the gateway cores (112 and 132 in FIG. 5) may include a gateway configuration task creator 610, a configuration task queue 620, a configuration task executor 630, a robot node configuration database 640, a robot node communication handler 650, a data converter 660, and a gateway communication handler 670.

When gateway configuration information is delivered from the gateway configuration processor 140, the gateway configuration task creator 610 reconfigures a configuration request as a batch task.

The configuration task queue 620 performs an operation for scheduling execution of the created configuration task.

The configuration task executor 630 is run asynchronously depending on the state of the configuration task queue 620, and executes the configuration task by interpreting information about the configuration task stored in the configuration task queue 620.

The robot node configuration database 640 stores pieces of detailed configuration information, such as distribution configuration information, subscription configuration information, and the like, depending on the gateway configuration information.

The robot node communication handler 650 is connected with a robot component 10 via the robot node manager 150, thereby transmitting and receiving robot protocol data.

The data converter 660 processes conversion between the data structure of a robot protocol message used by the robot component 10 and the data structure of a web-based protocol, such as XML, JSON, and the like, used in the gateway agent.

The gateway communication handler 670 receives a data message and a gateway configuration request message from other external gateway agents connected thereto and sends a message delivered from a robot node to other gateway agents.

Figure 7:
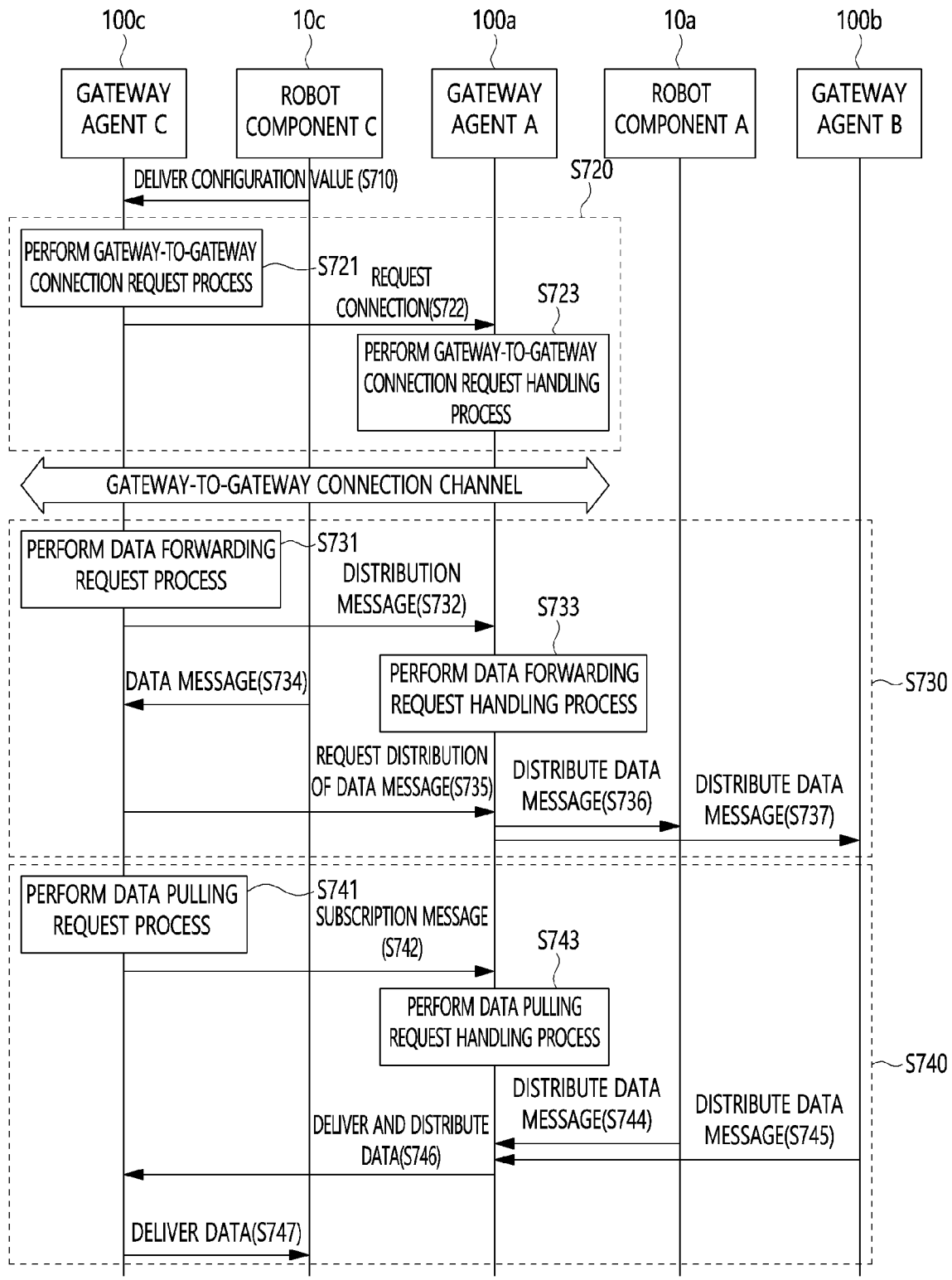
FIG. 7 is a signal flowchart for explaining a method for configuring communication between robot components in different networks according to an embodiment.

FIG. 7 is a signal flowchart for explaining a method for configuring communication between robot components in different networks according to an embodiment.

Referring to FIG. 1 and FIG. 7, a robot component 10c in subnet C 1c delivers gateway configuration information to a gateway agent 100c at step S710. Here, the gateway configuration information may be delivered to the gateway agent 100c using a configuration API (20c in FIG. 1).

Here, as illustrated in FIG. 2 and FIG. 3, the gateway configuration information may include distribution configuration information (240 in FIG. 2), which is information about robot data desired to be provided to robot components in other subnets, subscription configuration information (250 in FIG. 2), which is information about data desired to be received from robot components in other subnets, and the address (230 in FIG. 2) of a target gateway agent 100a, which provides service on a public IP address.

The gateway agent 100c performs a gateway-to-gateway connection process at step S720 by interworking with a gateway agent 100a corresponding to the target gateway agent address in the gateway configuration information delivered from the robot component 10c through the configuration API 20c.

At step S720, the gateway agent 100c performs a gateway-to-gateway connection request process at step S721, thereby sending a connection request to the gateway agent 100a at step S722.

Here, the internal components of the gateway agent 100c illustrated in FIG. 5 perform the following operations. When it receives the gateway configuration information through the configuration API 20c, the gateway configuration processor 140 requests the gateway client manager 120 to check whether a gateway client 110 mapped to the target gateway address is on a management list.

Here, when it is determined that a gateway client 110 mapped to the target gateway address is on the management list, the gateway client manager 120 returns information about the gateway client 110 to the gateway configuration processor 140. Accordingly, the gateway configuration processor 140 delivers distribution configuration information and subscription configuration information included in the gateway configuration information to the gateway core 112 of the corresponding gateway client 110.

Conversely, when it is determined that a gateway client 110 mapped to the target gateway address is not on the management list, the gateway client manager 120 creates a new gateway client 110 and delivers the target gateway address to which the new gateway client 110 is to connect. Accordingly, the persistent connection manager 111 of the new gateway client 110 continuously tries to connect to the target gateway agent 100a corresponding to the target gateway address.

Here, when connection to the target gateway agent 100a succeeds, the persistent connection manager 111 allocates a gateway core 112 for handling a gateway agent protocol (401 to 405 of FIG. 4) transmitted/received to/from the connected gateway agent 100a and notifies the gateway client manager 120 of the success in connection. In response to the notification from the persistent connection manager 111, the gateway client manager 120 adds the corresponding gateway client 110 to the management list.

Meanwhile, at step S720, the gateway agent 100a performs a gateway-to-gateway connection request handling process at step S723 in response to the connection request from the gateway agent 100c at step S722.

Here, the internal components of the gateway agent 100a illustrated in FIG. 5 perform the following operations. When the gateway agent 100a is run, the gateway endpoint 130 is run. Accordingly, when a connection request is received from at least one external gateway agent 100c, the multi-client connection manager 131 in the gateway endpoint 130 allocates a gateway core 121 for each connection request. Subsequently, the gateway core 121 handles the gateway agent protocol transmitted from the mapped gateway agent 100c.

When the process for connection to the gateway agent 100a, requested by the gateway agent 100c, succeeds at step S720, gateway agent protocols (401 to 405 in FIG. 4) are transmitted and received over the generated connection channel between the gateway agent 100c and the gateway agent 100a.

Subsequently, the gateway agent 100c performs a data forwarding process at step S730 by interworking with the gateway agent 100a depending on the distribution configuration information (240 in FIG. 2) included in the gateway configuration information.

The detailed internal operations of the respective gateway cores 112 of the gateway agents 100c and 100a for performing the data forwarding process at step S730 will be described below with reference to FIG. 6.

First, the data forwarding request process at step S731 is triggered when distribution configuration information is delivered to the gateway configuration processor 140 of the gateway agent 100c.

At step S731, the gateway configuration task creator 610 of the gateway core 112 creates a distribution configuration task for each of the individual items (241 in FIG. 2) included in the distribution configuration information received from the gateway configuration processor 140 and inserts the same in the configuration task queue 620.

Subsequently, when it discovers the distribution configuration task in the configuration task queue 620, the configuration task executor 630 requests the robot node manager 150 to receive robot data through the robot node communication handler 650. Here, the robot data is that the robot component 10c wants to distribute. The receiver of the robot data is set to the robot node communication handler 650 of the gateway core 112.

Accordingly, the configuration task executor 630 delivers a PUB message (401 in FIG. 4) of the gateway agent protocol to the target gateway agent 100a through the gateway communication handler 670 at step S732.

Here, the distribution configuration information may be stored in the robot node configuration database 640.

Subsequently, the data forwarding request handling process at step S723 may be launched when the gateway communication handler 670 of the gateway core 121 of the gateway agent 100a receives a PUB message from another gateway agent 100c.

When it receives the PUB message, the gateway communication handler 670 requests the robot node manager 150 to prepare for distribution of robot data corresponding to the topic name and the topic type in the PUB message.

When the data forwarding request and handling processes succeed through steps S731 to S733, a data message based on a robot protocol received from the robot component 10c in subnet C 1c at step S734 is delivered from the gateway agent 100c to the gateway agent 100a over the gateway-to-gateway connection channel through a data protocol between the gateways, and is then requested to be distributed at step S735.

That is, when the robot node communication handler 650 of the gateway agent 100c receives robot data from the robot component 10 through the robot node manager 150, the robot data is converted into a form of DATA message (405 in FIG. 4) of the gateway agent protocol through the data converter 660 and delivered to the target gateway agent 100a through the gateway communication handler 670.

Accordingly, the gateway agent 100a distributes the received data to the robot component 10a, which subscribes to robot data in the form defined in the data distribution information (240 in FIG. 2), in subnet A 1a at step S736, or distributes the same to another gateway agent 100b, which requests subscription to data in the corresponding robot data form, at step S737.

That is, payload data in the DATA message received from another gateway agent 100c through the gateway communication handler 670 is converted into data in a robot protocol form through the data converter 660 and is then distributed to a robot subnet 1a through the robot node communication handler 650.

Subsequently, the gateway agent 100c performs a data pulling process by interworking with the gateway agent 100a at step S740 depending on the subscription configuration information (250 in FIG. 2) included in the gateway configuration information received at step S710.

The detailed internal operations of the respective gateway cores 112 of the gateway agents 100c and 100a for performing the data pulling process at step S740 will be described below with reference to FIG. 6.

First, the data pulling request process at step S741 is triggered when subscription configuration information is delivered to the gateway configuration processor 140 of the gateway agent 100c.

For the subscription configuration information that the gateway core 112 of the gateway agent 100c receives from the gateway configuration processor 140 at step S741, the gateway configuration task creator 610 creates a subscription configuration task for each of the individual items of the subscription configuration information and inserts the same in the configuration task queue 620.

Subsequently, when it discovers the subscription configuration task in the configuration task queue 620, the configuration task executor 630 requests the gateway communication handler 670 to deliver a SUB message (403 in FIG. 4) of the gateway agent protocol to the target gateway agent 100a.

Here, the subscription configuration information may be stored in the robot node configuration database 640.

Meanwhile, the configuration task executor 630 requests the robot node manager 150 to prepare for distribution of robot data in the form set in the subscription configuration information to the subnet 1c.

Subsequently, the data pulling request handling process at step S743 is triggered when the gateway communication handler 670 of the gateway core 121 of the gateway agent 100a receives a SUB message (403 of FIG. 4) from another gateway agent 100c at step S742.

When it receives the SUB message, the gateway communication handler 670 requests the robot node manager 150 to receive robot data, corresponding to the topic name and the topic type included in the SUB message, in the subnet 1a, and sets the receiver to the robot node communication handler 650 of the corresponding gateway core 112.

When the data pulling request and handling processes succeed through steps S741 to S743, if the robot data corresponding to the data subscription information requested by the gateway agent 100c is distributed to subnet A 1a at steps S744 and S745, the gateway agent 100a delivers the corresponding robot data to the gateway agent 100c at step S746 over the gateway-to-gateway connection channel through a data protocol between the gateways.

Here, the robot data received by the robot node communication handler 650 of the gateway agent 100a is configured in the form of a DATA message (405 in FIG. 4) of the gateway agent protocol through the data converter 660 and is delivered to the target gateway agent 100c.

Accordingly, the gateway agent 100c delivers the robot data received from the gateway agent 100a to the robot component 10c that requests subscription at step S747.

Here, when the DATA message is received from the gateway agent 100a, the gateway communication handler 670 delivers the payload data included in the DATA message to the data converter 660 so as to convert the same into data in the form of a robot protocol, and delivers the converted data to the robot component 10c through the robot node communication handler 650 connected to the robot node manager 150.

Through the gateway-to-gateway connection configured as described above, a data communication flow between robots in different networks (e.g., from a robot component 10c-2 to a robot component 10b-2) is enabled based on a web-based gateway agent protocol, as illustrated in FIG. 1, and data communication between robots in different networks based on a web-based protocol may be realized.

Meanwhile, the robot component 10b-2 distributes data using a robot protocol in subnet B 1b. Here, when the robot component 10b-2 delivers configuration information for communication with other subnets to the gateway agent 100b using a configuration API 20b, operations that are the same as those illustrated in FIG. 7 may be performed. The detailed steps are the same as those illustrated in FIG. 7, and thus a detailed description thereof will be omitted.

Figure 8:
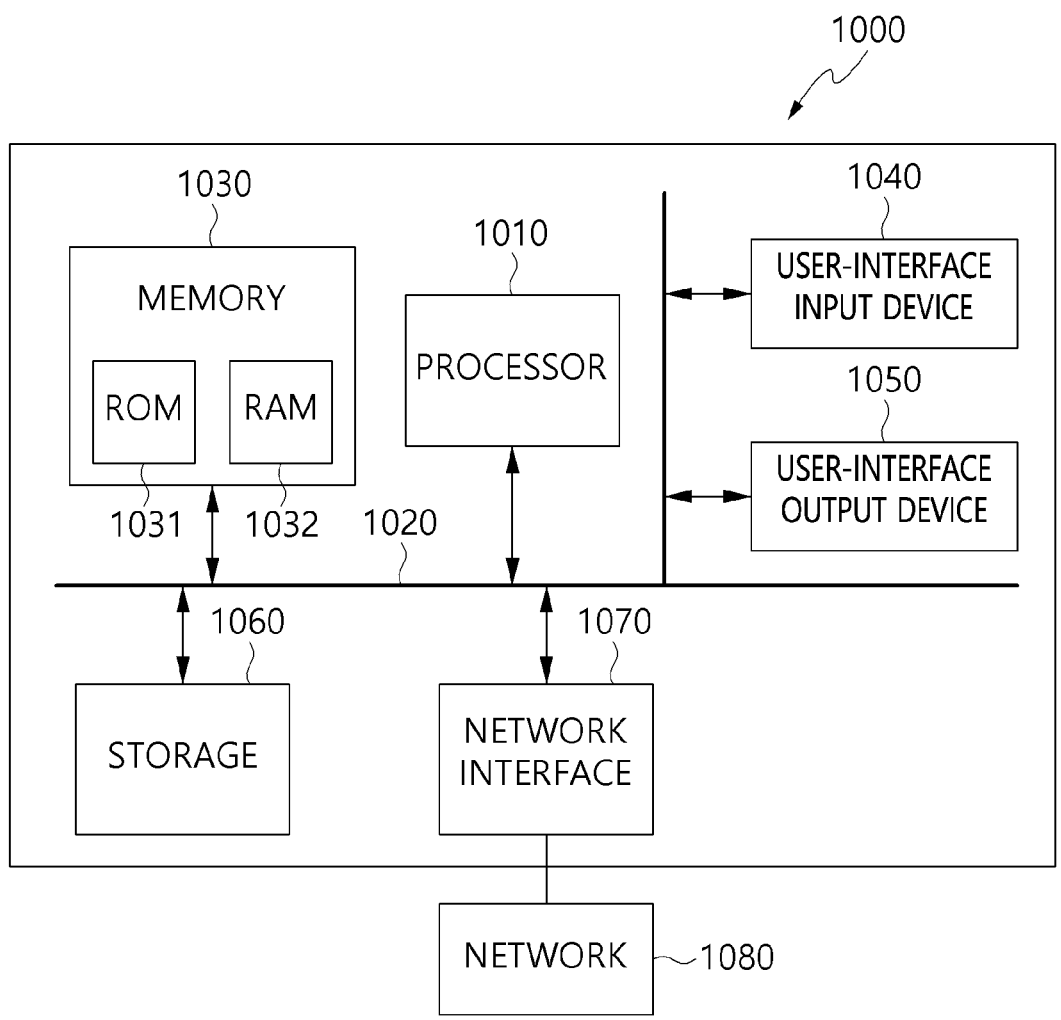
FIG. 8 is a view illustrating a computer system configuration according to an embodiment.

FIG. 8 is a view illustrating a computer system configuration according to an embodiment.

The gateway agent 100 according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to an embodiment, when different IP address bands or subnets are present, if a gateway agent run in a subnet is able to access the service address of at least one gateway agent run in another subnet, robot software components using a robot protocol that are respectively run in different subnets may perform data communication therebetween.

Particularly, there is an advantage in which, when at least one gateway agent provides service on a public IP address, data communication between robot software components run in multiple subnets connected to the gateway agent is enabled.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. A method for configuring communication between robot components in different networks, comprising:
   receiving, from at least one first robot component present in a subnet, gateway configuration information for requesting a configuration for communication with a second robot component in another subnet;
   performing a gateway-to-gateway connection process by interworking with a target gateway agent corresponding to a target gateway agent address included in the gateway configuration information; and
   performing at least one of a data forwarding process corresponding to distribution configuration information included in the gateway configuration information, or a data pulling process corresponding to subscription configuration information included in the gateway configuration information, or a combination thereof through a gateway-to-gateway connection channel, wherein:
the distribution configuration information is information about robot data desired to be provided to robot components in other subnets, and
the subscription configuration information is information about robot data desired to be received from robot components in other subnets,
wherein each of the subnet and another subnet is configured such that at least one robot component using a robot protocol (ROS) that is used only in a corresponding subnet is run,
wherein the data forwarding process includes
converting robot data of a robot protocol received from the at least one first robot component into a data message, and
delivering the data message to the target gateway agent, and
wherein the data pulling process includes
converting a data message received from the target gateway agent into robot data of a robot protocol and delivering the robot data to the at least one first robot component.

2. The method of claim 1, wherein the gateway configuration information is delivered from the at least one first robot component through a separate configuration API.

3. The method of claim 1, wherein:
messages are sent and received according to a gateway agent protocol over the gateway-to-gateway connection channel, and
the gateway agent protocol includes a distribution message for requesting a robot data delivery configuration, a distribution cancellation message for requesting cancellation of the robot data delivery configuration, a subscription message for requesting a robot data subscription configuration, a subscription cancellation message for cancelling a request for the robot data subscription configuration, and a data message for transmitting robot data by containing the robot data in a payload.

4. The method of claim 1, wherein the gateway-to-gateway connection process includes
checking whether a gateway client mapped to the target gateway agent is present in a management list,
when a gateway client mapped to the target gateway agent is present in the management list, delivering the gateway configuration information to the gateway client, and
when a gateway client mapped to the target gateway agent is not present in the management list, newly generating a gateway client mapped to the target gateway agent, continuously attempting connection to the target gateway agent, and adding the gateway client to the management list when the connection succeeds.

5. The method of claim 4, wherein the data forwarding process further includes
setting a gateway core of the gateway client to receive robot data from the at least one first robot component, and
sending a distribution message to the target gateway agent.

6. The method of claim 4, wherein the data pulling process further includes
sending a subscription message to the target gateway agent, and
preparing for distribution of robot data corresponding to the subscription configuration information.

7. A method for configuring communication between robot components in different networks, comprising:
performing a gateway-to-gateway connection process between multiple subnets by interworking with a first additional gateway agent in response to a connection request from the first additional gateway agent; and
performing at least one of a data forwarding process corresponding to a distribution message delivered from the first additional gateway agent, or a data pulling process corresponding to a subscription message delivered from the first additional gateway agent, or a combination thereof through a gateway-to-gateway connection channel,
wherein each of the multiple subnets is configured such that at least one robot component using a robot protocol (ROS) that is used only in a corresponding subnet is run,
wherein the data forwarding process includes
receiving a data message from the first additional gateway agent,
converting payload data of the data message into robot data of a robot protocol, and
distributing the robot data to a robot component of a subnet that requests subscription to robot data in a corresponding format,
wherein the data pulling process includes
converting robot data corresponding to the subscription message, received through a robot protocol, into a data message of the gateway agent protocol, and
delivering the data message to the first additional gateway agent.

8. The method of claim 7, wherein:
messages are sent and received according to a gateway agent protocol over the gateway-to-gateway connection channel, and
the gateway agent protocol includes a distribution message for requesting a robot data delivery configuration, a distribution cancellation message for requesting cancellation of the robot data delivery configuration, a subscription message for requesting a robot data subscription configuration, a subscription cancellation message for cancelling a request for the robot data subscription configuration, and a data message for transmitting robot data by containing the robot data in a payload.

9. The method of claim 8, wherein the gateway-to-gateway connection process comprises allocating a gateway core for sending and receiving the gateway agent protocol to and from the first additional gateway agent.

10. The method of claim 9, wherein the data forwarding process further includes
configuring distribution of robot data corresponding to a topic name and a topic type included in the distribution message.

11. The method of claim 10, wherein the data forwarding process further includes
distributing the data message of the gateway agent protocol to a second additional gateway agent that requests subscription.

12. The method of claim 9, wherein the data pulling process further includes
preparing for reception of robot data corresponding to a topic name and a topic type of the subscription message.

13. The method of claim 12, wherein the data pulling process further includes
  distributing a data message of the gateway agent protocol received from a second additional gateway agent to the first additional gateway agent.

14. A gateway agent, comprising:
memory in which at least one program is recorded; and
a processor for executing the program,
wherein the program includes
at least one gateway client for sending and receiving a gateway agent protocol message over a connection channel with a target gateway agent, which is a connection target,
a gateway client manager for newly generating and managing a corresponding gateway client in response to a request to connect to a gateway agent of an additional subnet,
a gateway endpoint for sending and receiving a gateway agent protocol message over a connection channel with an additional gateway agent that requests connection,
a gateway configuration processor for delivering a communication configuration file to the at least one gateway client and the gateway endpoint, and
a robot node manager for linking a robot component included in a subnet to which the gateway agent belongs with the at least one gateway client and the gateway endpoint,
wherein the at least one gateway client includes
a first gateway core for performing at least one of a data forwarding process corresponding to distribution configuration information included in the gateway configuration information, or a data pulling process corresponding to subscription configuration information included in the gateway configuration information, or a combination thereof through a gateway-to-gateway connection channel,
wherein each of the multiple subnets is configured such that at least one robot component using a robot protocol (ROS) that can be used only in a corresponding subnet is run,
wherein the data forwarding process includes
converting robot data of a robot protocol received from a first robot component into a data message, and
delivering the data message to the target gateway agent
wherein the data pulling process includes
converting a data message received from the target gateway agent into robot data of a robot protocol and delivering the robot data to the first robot component.

15. The gateway agent of claim 14, wherein the at least one gateway client further includes
  a persistent connection manager for maintaining a persistent connection with the target gateway agent depending on gateway configuration information delivered from the gateway configuration processor.

16. The gateway agent of claim 15, wherein the data forwarding process further includes
  setting the first gateway core to receive robot data from a first robot component, and
  sending a distribution message to the target gateway agent.

17. The gateway agent of claim 15, wherein the data pulling process further includes
  sending a subscription message to the target gateway agent, and
  preparing for distribution of robot data corresponding to the subscription configuration information.

18. The gateway agent of claim 14, wherein the gateway endpoint includes
  at least one gateway core for performing at least one of a data forwarding process corresponding to a distribution message received from the additional gateway agent, or a data pulling process corresponding to a subscription message received from the additional gateway agent, or a combination thereof through a gateway-to-gateway connection channel, and
  a multi-client connection manager for generating and managing a gateway core mapped to each of one or more other gateway agents in response to a connection request therefrom.

19. The gateway agent of claim 18, wherein the data forwarding process includes
  configuring distribution of robot data corresponding to a topic name and a topic type included in the distribution message,
  receiving a data message from the additional gateway agent, converting payload data of the data message into robot data of a robot protocol, and
  distributing the robot data to a robot component in the subnet to which the gateway agent belongs, which requests subscription to robot data in a corresponding format.

20. The gateway agent of claim 18, wherein the data pulling process includes
  preparing for reception of robot data corresponding to a topic name and a topic type of the subscription message,
  converting robot data corresponding to the subscription message, received through a robot protocol, into a data message of a gateway agent protocol, and
  delivering the data message to the additional gateway agent.

* * * * *